US012420714B2

(12) United States Patent
Yamamoto (10) Patent No.: US 12,420,714 B2
(45) Date of Patent: Sep. 23, 2025

(54) VEHICLE PERIPHERY MONITORING SYSTEM, VEHICLE PERIPHERY MONITORING METHOD AND A NON-TRANSITORY STORAGE MEDIUM

(71) Applicants: TOYOTA JIDOSHA KABUSHIKI KAISHA, Toyota (JP); DENSO CORPORATION, Aichi-pref (JP)

(72) Inventor: Yuki Yamamoto, Toyota (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 111 days.

(21) Appl. No.: 18/472,808

(22) Filed: Sep. 22, 2023

(65) Prior Publication Data

US 2024/0140311 A1 May 2, 2024

(30) Foreign Application Priority Data

Oct. 26, 2022 (JP) ................................ 2022-171415

(51) Int. Cl.
*B60R 1/26* (2022.01)
*B60R 1/12* (2006.01)

(52) U.S. Cl.
CPC ................ *B60R 1/26* (2022.01); *B60R 1/12* (2013.01); *B60R 2001/1253* (2013.01); *B60R 2300/105* (2013.01); *B60R 2300/303* (2013.01); *B60R 2300/305* (2013.01); *B60R 2300/8066* (2013.01)

(58) Field of Classification Search
CPC ..... B60R 1/26; B60R 1/12; B60R 2001/1253; B60R 2300/105; B60R 2300/303; B60R 2300/305; B60R 2300/8066; B60R 1/00; B60R 1/25; B60R 2300/304; G06V 20/54; G06V 20/56; H04N 5/265; H04N 23/57; H04N 23/90
See application file for complete search history.

(56) References Cited

U.S. PATENT DOCUMENTS

| | | | |
|---|---|---|---|
| 12,088,952 B2* | 9/2024 | Nagata | H04N 5/2628 |
| 2018/0056870 A1* | 3/2018 | Kosugi | H04N 23/69 |
| 2018/0272937 A1* | 9/2018 | Kumon | B60R 1/04 |
| 2018/0272948 A1* | 9/2018 | Kumon | G06T 19/006 |
| 2019/0135180 A1 | 5/2019 | Watatsu et al. | |
| 2019/0199940 A1* | 6/2019 | Shidochi | B60R 1/28 |
| 2020/0369207 A1* | 11/2020 | Yoshida | B60K 35/00 |
| 2021/0206318 A1 | 7/2021 | Iida et al. | |

FOREIGN PATENT DOCUMENTS

| | | |
|---|---|---|
| DE | 11 2018 007 360 T5 | 1/2021 |
| JP | 10-257482 A | 9/1998 |
| JP | 2021-111854 A | 8/2021 |

* cited by examiner

*Primary Examiner* — James M Pontius
(74) *Attorney, Agent, or Firm* — Sughrue Mion, PLLC (57) ABSTRACT

In a video processing section of a vehicle periphery monitoring system, a virtual mirror video is generated in which a virtual vehicle image virtually illustrating a vehicle and a left-right direction display image indicating left-right directions of the vehicle are overlay displayed on a synthesized video that has been synthesized so as to connect videos captured by a rear camera, a first side camera, and a second side camera together and so as to be reversed in a vehicle width direction.

5 Claims, 6 Drawing Sheets

VEHICLE PERIPHERY MONITORING SYSTEM, VEHICLE PERIPHERY MONITORING METHOD AND A NON-TRANSITORY STORAGE MEDIUM

CROSS-REFERENCE TO RELATED APPLICATION

This application is based on and claims priority under 35 USC 119 from Japanese Patent Application No. 2022-171415 filed on Oct. 26, 2022, the disclosures of which are incorporated by reference herein.

BACKGROUND

Technical Field

The present disclosures relates to a vehicle periphery monitoring system, and to a vehicle periphery monitoring method and a non-transitory storage medium.

Related Art

Technology related to a vehicle periphery situation display device is disclosed in Japanese Patent Application Laid-Open (JP-A) No. 10-257482.

In this vehicle periphery situation display device, vehicle left and right side images captured by cameras disposed in the vicinity of left and right doors, and a vehicle rear image captured by a camera disposed at a vehicle rear section are synthesized so as to be viewed from a single virtual viewpoint and displayed on a liquid crystal panel.

However, in the technology according to JP-A No. 10-257482, although a state of a rear side of an ego vehicle can be represented, there is room for improvement from the perspective of representing a relative positional relationship between the ego vehicle and an object positioned at a periphery of the ego vehicle and at the rear side of the ego vehicle.

SUMMARY

In consideration of the above circumstances, an object of the present disclosure is to obtain a vehicle periphery monitoring system and a vehicle periphery monitoring method and a non-transitory storage medium that are capable of representing a relative positional relationship between an ego vehicle and an object positioned at a periphery of the ego vehicle and at the rear side of the ego vehicle.

A vehicle periphery monitoring system of a first aspect of the present disclosure includes a rearward image capture section configured to capture an image of a rearward of a vehicle at a vehicle width direction central portion, a first side image capture section configured to capture an image of the rearward of the vehicle at a vehicle width direction one-side, a second side image capture section configured to capture an image of the rearward of the vehicle at a vehicle width direction other-side, a video processing section that is configured to generates a virtual mirror video, in which a virtual vehicle image virtually illustrating the vehicle and a left-right direction display image indicating left-right directions of the vehicle are overlaid on a synthesized video that has been synthesized so as to connect videos captured by the rearward image capture section, by the first side image capture section, and by the second side image capture section, and so as to be reversed in a vehicle width direction, and a display disposed at a position visible to a driver of the vehicle and configured to display the virtual mirror video.

In the vehicle periphery monitoring system of the first aspect, the image rearward of the vehicle is captured by the rearward image capture section at the vehicle width direction central portion, the image rearward of the vehicle is captured by the first side image capture section at the vehicle width direction one-side, and the image rearward of the vehicle is captured by the second side image capture section at the vehicle width direction other-side.

Moreover, in the video processing section, the virtual mirror video is generated in which the virtual vehicle image virtually illustrating the vehicle and the left-right direction display image indicating left-right directions of the vehicle are overlaid displayed on the synthesized video that has been synthesized so as to the connect videos captured by the rearward image capture section, the first side image capture section, and the second side image capture section together and so as to be reversed in a vehicle width direction.

The virtual mirror video generated by the video processing section is then displayed on the display section disposed at the position visible by the driver of the vehicle.

This means that in the present disclosure when, for example, an other-vehicle is travelling at the rear side of an ego vehicle, the virtual vehicle image and a video of the other-vehicle are displayed in the virtual mirror video. As a result thereof, the driver is able to ascertain the relative positional relationship between the ego vehicle and the other-vehicle by looking at the virtual mirror video displayed on the display section.

A vehicle periphery monitoring system of a second aspect is the vehicle periphery monitoring system of the first aspect, further including a display change section configured to switch between a first state in which the virtual mirror video is displayed at the display and a second state in which the virtual mirror video is not displayed at the display based on operation by the driver.

In the vehicle periphery monitoring system of the second aspect, the display change section is able to switch between the first state in which the virtual mirror video is displayed on the display and the second state in which the virtual mirror video is not displayed on the display based on operation by the driver.

This means that in the present disclosure, in the second state various information utilizable by the driver of the vehicle, for example, is able to be displayed on the display.

A vehicle periphery monitoring system of a third aspect is the vehicle periphery monitoring system of the second aspect, wherein the display change section switches between the first state and the second state based on operation of an indicator lever by the driver.

In the vehicle periphery monitoring system of the third aspect, when the driver operates the indicator lever, the display change section switches between the first state in which the virtual mirror video is displayed on the display section and the second state in which the virtual mirror video is not displayed on the display section.

Thus in the present disclosure, the virtual mirror video is displayed on the display during a left turn or a right turn of the vehicle, enabling the driver to ascertain a state rearward of the vehicle.

A vehicle periphery monitoring method of a fourth aspect includes generating a synthesized video that has been synthesized so as to connect a first video of rearward of a vehicle at a vehicle width direction central portion, a second video of the rearward of the vehicle at a vehicle width direction one-side, and a third video of the rearward of the vehicle at a vehicle width direction other-side and so as to be reversed in a vehicle width direction, generating a virtual mirror video in which a virtual vehicle image virtually illustrating the vehicle and a left-right direction display image indicating left-right directions of the vehicle are overlaid on the synthesized video, and displaying the virtual mirror video on a display.

A non-transitory storage medium of a fifth aspect is a non-transitory storage medium storing a program causing processing to be executed by at least one processor in a computer. The processing includes generating a synthesized video that has been synthesized so as to connect a first video of a rearward of a vehicle at a vehicle width direction central portion, a second video of the rearward of the vehicle at a vehicle width direction one-side, and a third video of the rearward of the vehicle at a vehicle width direction other-side and so as to be reversed in a vehicle width direction, generating a virtual mirror video in which a virtual vehicle image virtually illustrating the vehicle and a left-right direction display image indicating left-right directions of the vehicle are overlaid on the synthesized video, and performing display control of the virtual mirror video.

As described above, the vehicle periphery monitoring system and the vehicle periphery monitoring method and the non-transitory storage medium according to the present disclosure exhibit the excellent advantageous effect of enabling a relative positional relationship to be indicted between an ego vehicle and an object positioned at a periphery of the ego vehicle and at a rear side of the ego vehicle.

BRIEF DESCRIPTION OF THE DRAWINGS

Exemplary embodiments of the present disclosure will be described in detail based on the following figures, wherein.

DETAILED DESCRIPTION

Figure 2:
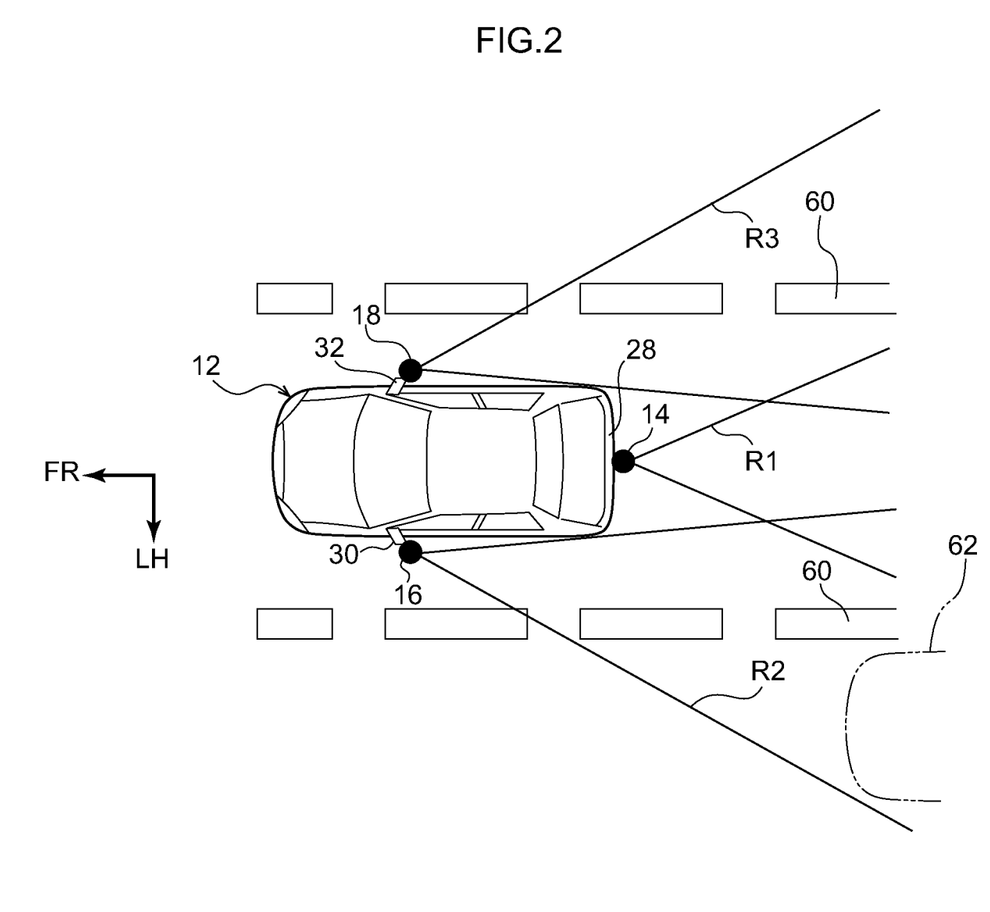
FIG. 2 is a plan view illustrating image capture ranges of cameras configuring part of a vehicle periphery monitoring system according to the present exemplary embodiment.
Figure 3:
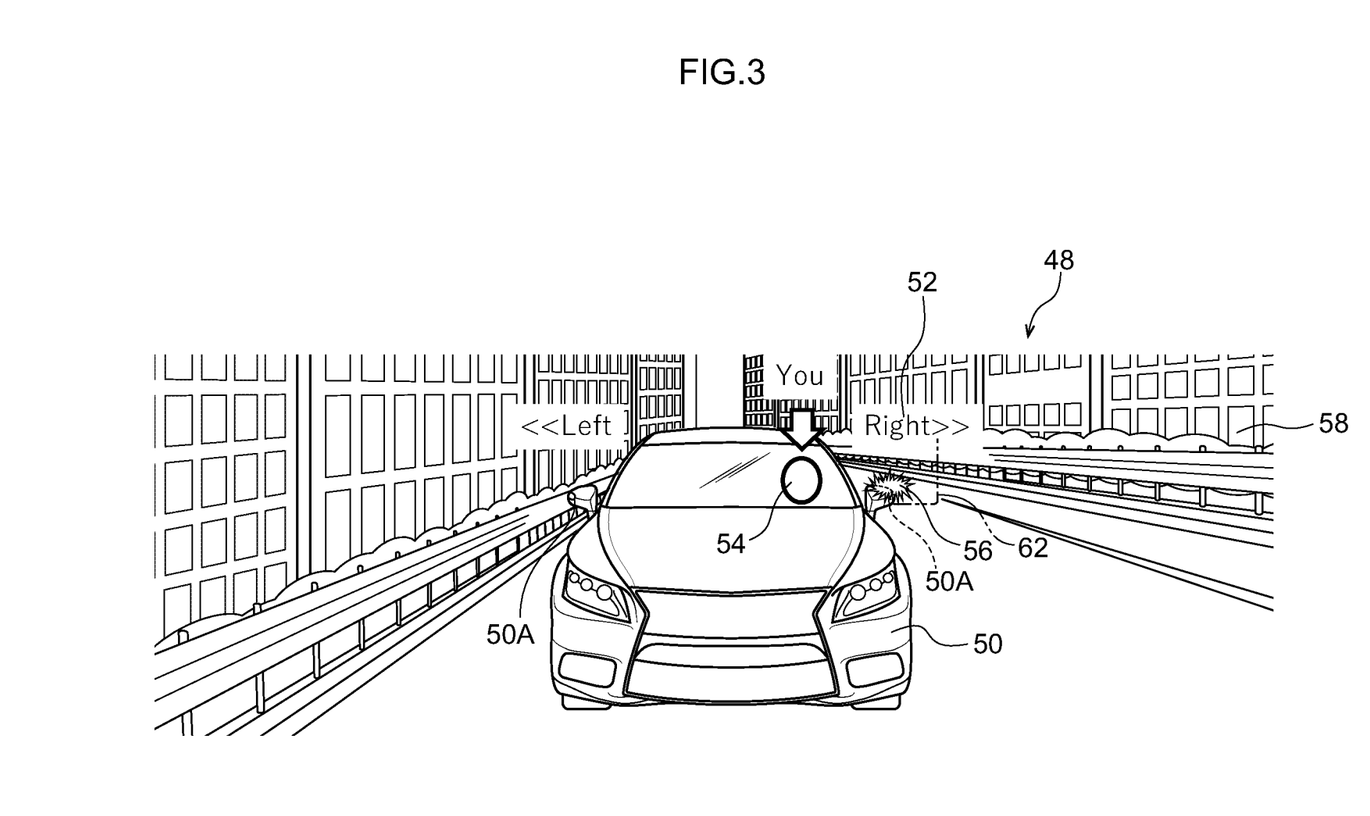
FIG. 3 is a conceptual diagram illustrating an example of a virtual mirror video generated in a vehicle periphery monitoring system according to the present exemplary embodiment.
Figure 4:
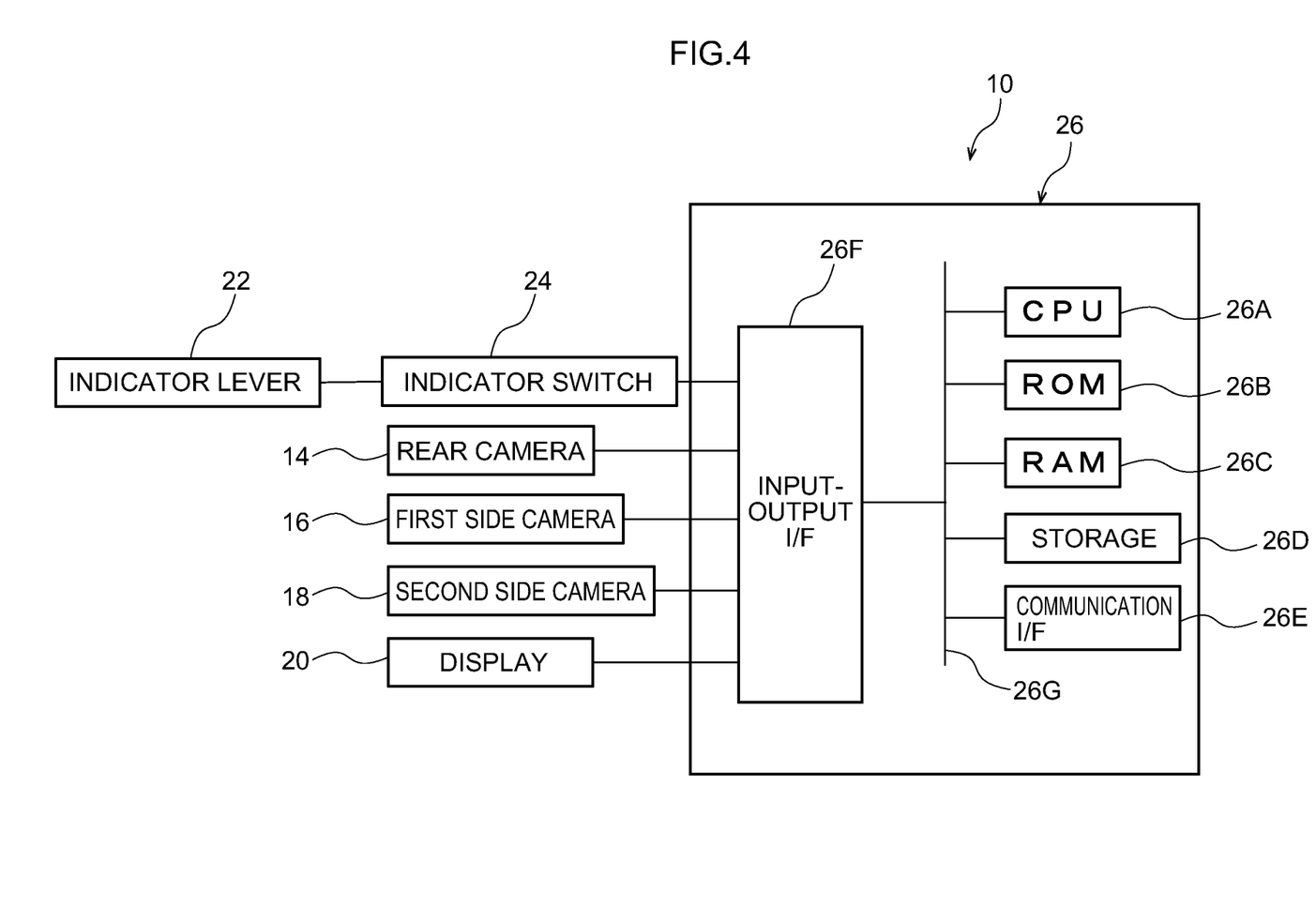
FIG. 4 is a block diagram illustrating a hardware configuration of a vehicle periphery monitoring system according to the present exemplary embodiment.

Description follows regarding an example of an exemplary embodiment of a vehicle periphery monitoring system, with reference to FIG. 1 to FIG. 6. As illustrated in FIG. 4, a "vehicle periphery monitoring system 10" according to the present exemplary embodiment includes a "rear camera 14" serving as a rearward image capture section installed to a "vehicle 12" (hereafter also referred to as ego vehicle 12), a "first side camera 16" serving as a first side image capture section, a "second side camera 18" serving as a second side image capture section, a "touch panel display 20" serving as a display section, an "indicator lever 22", an indicator switch 24, and a "control device 26" serving as a computer.

Note that as appropriate in the drawings, an arrow FR indicates a vehicle front side of the vehicle 12, an arrow UP indicates a vehicle upward direction of the vehicle 12, and an arrow LH indicates a vehicle width direction left side of the vehicle 12.

The rear camera 14 is, as an example, configured by a digital camera having a fixed orientation optical axis and including a lens having a fixed focal point and wide-angle. As illustrated in FIG. 2, the rear camera 14 is provided to a vehicle width direction central portion at a vehicle rear side end portion of a trunk lid 28 in a state in which the optical axis thereof is oriented in a vehicle front-rear direction as viewed along a vehicle height direction. The rear camera 14 is capable of capturing images over an image capture range R1 at the vehicle rear side. The rear camera 14 is configured so as to send a video signal of a video captured by the rear camera 14 to the control device 26.

Figure 1:
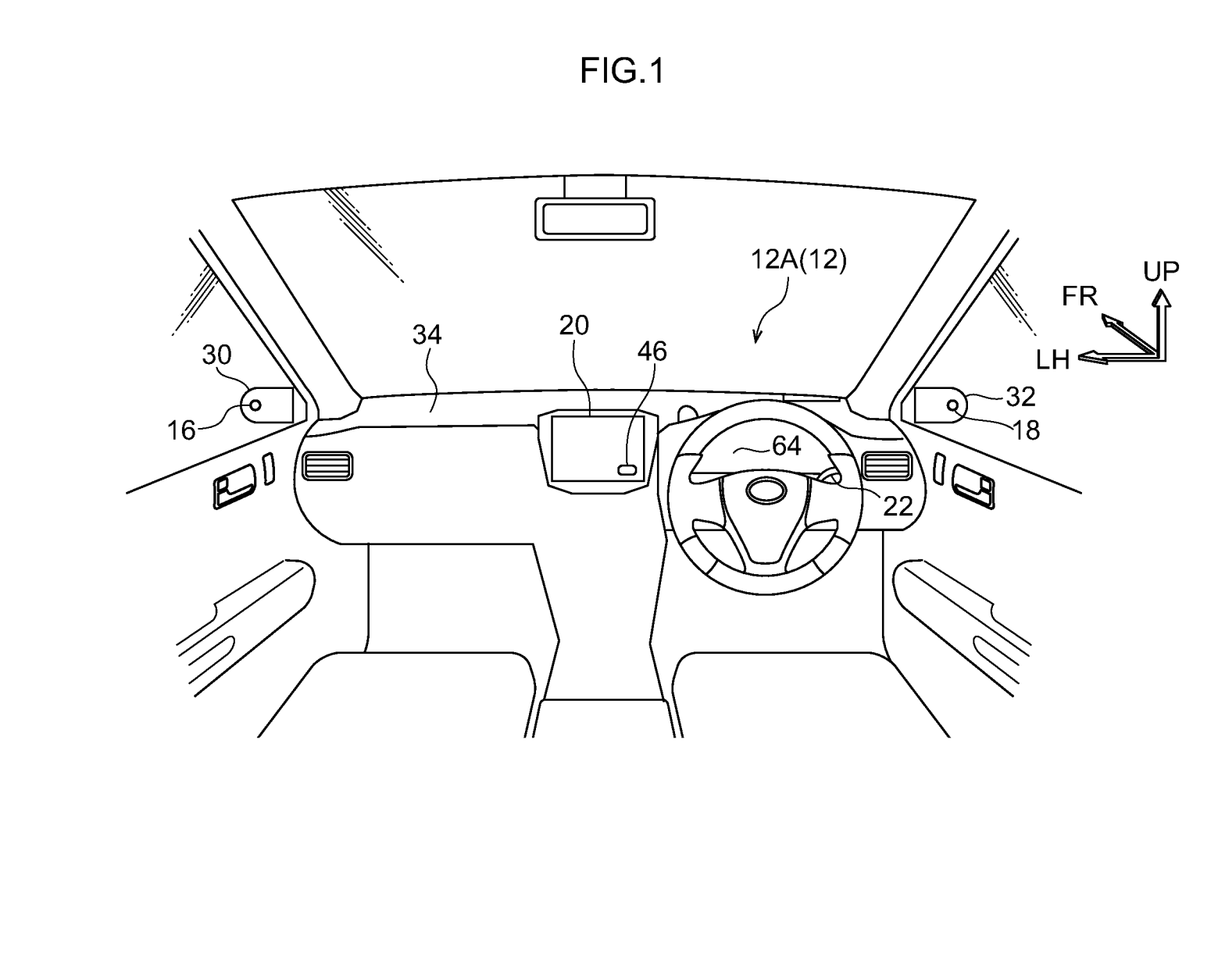
FIG. 1 is a perspective view schematically illustrating a state looking toward a vehicle front side from inside a vehicle cabin equipped with a vehicle periphery monitoring system according to the present exemplary embodiment.

The first side camera 16 is configured basically the same as the rear camera 14. As illustrated in FIG. 1, the first side camera 16 is provided to a side mirror 30 at a vehicle width direction left side in a state in which the optical axis thereof is tilted toward the vehicle width direction left side with respect to a vehicle front-rear direction as viewed along the vehicle height direction. The first side camera 16 is capable of capturing images over an image capture range R2 at a vehicle rear left side. The first side camera 16 is configured so as to send a video captured by the first side camera 16 as a video signal to the control device 26.

The second side camera 18 is configured basically the same as the rear camera 14. The second side camera 18 is provided to a side mirror 32 at a vehicle width direction right side in a state in which the optical axis thereof is tilted toward the vehicle width direction right side with respect to a vehicle front-rear direction as viewed along the vehicle height direction. The second side camera 18 is capable of capturing images over an image capture range R3 at a vehicle rear right side. The second side camera 18 is configured so as to send a video captured by the second side camera 18 as a video signal to the control device 26.

The touch panel display 20 is arranged at a vehicle width direction central portion of an instrument panel 34 arranged in a vehicle front side section of the vehicle cabin 12A of the vehicle 12. The touch panel display 20 is capable of displaying various videos and images under control of the control device 26, and is also configured so as to send an operation signal based on a contact operation by a driver to the control device 26.

The indicator lever 22 extends in a vehicle width direction from a non-illustrated steering column, and is able to swing in the vehicle height direction, about a steering column side as a pivot point, under operation by the driver. Note that in the present exemplary embodiment, as an example the vehicle 12 is a right hand drive vehicle, and the indicator lever 22 extends from the steering column toward the vehicle width direction right side. Configuration is such that the operation direction of the indicator lever 22 by the driver is detected by the indicator switch 24.

The indicator switch 24 is configured including a non-illustrated left indicator switch and right indicator switch. The left indicator switch makes an electrical contact in a specific circuit when the driver has operated the indicator lever 22 so as to flash a non-illustrated left turn signal lamp of the vehicle 12, enabling a left turn signal to be input to the control device 26.

The right indicator switch makes an electrical contact in the specific circuit when the driver has operated the indicator lever 22 to flash a non-illustrated right turn signal lamp of the vehicle 12, enabling a right turn signal to be input to the control device 26.

The present exemplary embodiment includes a non-illustrated steering angle sensor that detects a steering angle of a steering wheel 36, and is configured such that a steering angle detection signal based on the steering angle is input to the control device 26. Based on the steering angle detection signal, the control device 26 is able to detect completion of a vehicle lane change, left turn, and right turn of the vehicle 12.

Returning to FIG. 4, the control device 26 is configured including a "central processing unit (CPU) 26A" as an example of a processor, read only memory (ROM) 26B, random access memory (RAM) 26C, storage 26D, a communication interface (I/F) 26E, and an input-output I/F 26F. The CPU 26A, the ROM 26B, the RAM 26C, the storage 26D, the communication I/F 26E, and the input-output I/F 26F are connected together through a bus 26G so as to be capable of communicating with each other.

The CPU 26A is a central processing unit capable of executing various programs according to various controls on the touch panel display 20. More specifically, the CPU 26A is configured so as to be capable of reading a program from the ROM 26B and executing the program using the RAM 26C as workspace. The control device 26 is configured so as to be capable of exhibiting various functions, as described later, by the CPU 26A reading an execution program stored on the ROM 26B and executing the program.

Storage 26D is configured including a hard disk drive (HDD) or a solid state drive (SSD), and is stored with various programs including an operating system, and with various data including map data and various image data for displaying on the touch panel display 20.

The communication I/F 26E is configured as an interface employed to connect the control device 26 to a non-illustrated network N, and communication I/F 26E enables updating and the like of various data stored on the storage 26D by communication with a non-illustrated server or the like over the network N. Note that a communication standard that may be adopted in communication of the communication I/F 26E is, for example, Ethernet (registered trademark), LTE, FDDI, or Wi-Fi (registered trademark).

The input-output I/F 26F is configured as an interface for the control device 26 to communicate with other devices installed to the vehicle 12, namely with the rear camera 14, the first side camera 16, the second side camera 18, the touch panel display 20, and the indicator switch 24 etc. that have been described above. The control device 26 is connected to each device described later through the input-output I/F 26F so as to be capable of communicating with each other. Note that these devices may be connected directly to the bus 26G.

Figure 5:
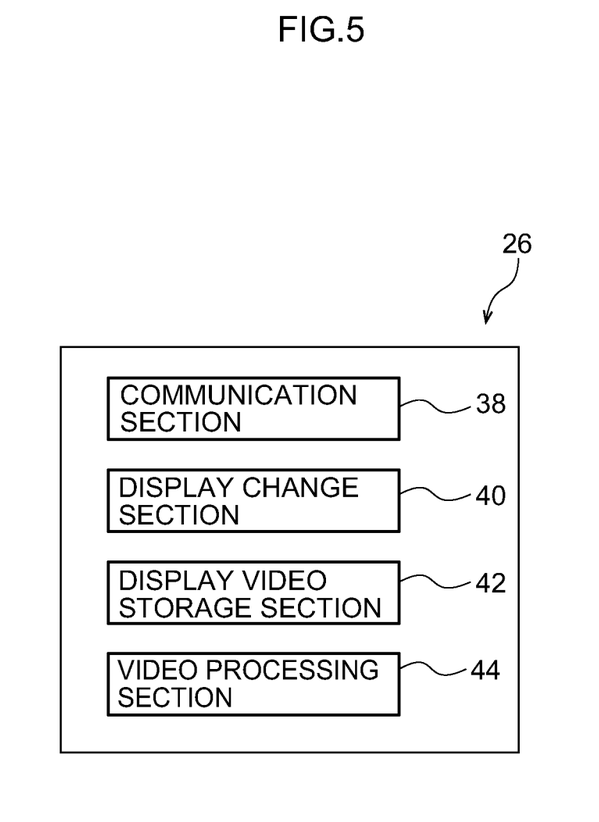
FIG. 5 is a block diagram illustrating a functional configuration of a control device configuring part of a vehicle periphery monitoring system according to the present exemplary embodiment.

Next, description follows regarding a functional configuration of the control device 26, with reference to FIG. 5. In the control device 26, the CPU 26A reads an execution program stored on the ROM 26B, and by executing the program functions as a combined body of a communication section 38, a "display change section 40", a display video storage section 42, and a "video processing section 44".

The communication section 38 is able to exchange various information with a server over the network N.

The display change section 40 is able to switch modes based on operation of the driver, switching between a rearward video display mode serving as a first state in which a rearward video of the vehicle 12, described later, is displayed on the touch panel display 20, and a normal video display mode serving as a second state in which information other than the rearward video of the vehicle 12, such as map information or the like, is displayed on the touch panel display 20.

More specifically, the display change section 40 is configured so as to switch between the rearward video display mode and the normal video display mode by the driver performing a contact operation on a display-change switch icon 46 (see FIG. 1) that is always displayed on the touch panel display 20. Note that the display change section 40 may be configured so as to enable switching between the rearward video display mode and the second state by the driver operating a mechanical change switch capable of inputting a specific signal to the control device 26.

Moreover, the display change section 40 is configured so as to switch between the rearward video display mode and the normal video display mode by being input with the left turn signal or the right turn signal from the indicator switch 24.

More specifically, the display change section 40 is configured so as to switch the touch panel display 20 to the rearward video display mode when the left turn signal or the right turn signal is input in a state in which the touch panel display 20 is in the normal video display mode. The display change section 40 determines whether or not a vehicle lane change, left turn, or right turn of the vehicle 12 has been completed based on an steering angle detection signal input from the steering angle sensor, and is configured so as to switch to the normal video display mode when these are determined complete, and to maintain the rearward video display mode when these are determined not complete.

As illustrated in FIG. 3, image data of a "virtual vehicle image 50", a "left-right direction display image 52", a driver icon 54, and a turn signal effect 56 for display in a later described "virtual mirror video 48" are stored in the display video storage section 42.

More specifically, the virtual vehicle image 50 is configured by three-dimensional image data of when the ego vehicle 12 is viewed from the front face side (when the vehicle 12 is viewed in a state face-on to the vehicle 12). Note that the virtual vehicle image 50 may be an image of a simplified external appearance of the vehicle 12.

A left-right direction display image 52 is configured from two-dimensional image data representing left-right directions of a virtual mirror video 48. The left-right direction display image 52 includes an arrow and a text string indicating the vehicle width direction left side displayed at a position on the vehicle width direction left side of the virtual vehicle image 50 with reference to the ego vehicle 12 when the driver is looking at the touch panel display 20, and an arrow and a text string indicating the vehicle width direction right side displayed at a position on the vehicle width direction right side of the virtual vehicle image 50.

The driver icon 54 is an icon to suggest a position of the driver in the virtual mirror video 48, and is configured so as to be virtually displayed at the inside of the virtual vehicle image 50. The driver icon 54 is configured so as to be displayed at a seat position side of the driver in the ego vehicle 12 when the driver is looking at the touch panel display 20.

The turn signal effect 56 is configured by a computer graphic representing a flashing state of a turn signal lamp.

The video processing section 44 performs synthesis processing on the videos captured by the rear camera 14, the first side camera 16, and the second side camera 18 so as to generate a "synthesized video 58" that is a rearward video depicting a vehicle rear side of the vehicle 12 synthesized such that the captured videos are connected together and reversed in the vehicle width direction.

The video processing section 44 is configured so as to generate the virtual mirror video 48 having the virtual vehicle image 50, the left-right direction display image 52, the driver icon 54, and the turn signal effect 56 overlay displayed on the synthesized video 58, and to display this virtual mirror video 48 on the touch panel display 20.

More specifically, the video processing section 44 generates a virtual three-dimensional space based on the videos captured by the rear camera 14, the first side camera 16, and the second side camera 18 and, for example, sets a position of the virtual vehicle image 50 on the synthesized video 58 with reference to positions of part of the vehicle 12, a vehicle lane 60 (see FIG. 2), and the like depicted in this video. The video processing section 44 then sets a position of the left-right direction display image 52 with respect to the synthesized video 58 with reference to the position of the virtual vehicle image 50 with respect to the synthesized video 58.

The video processing section 44 is configured so as to be able to detect a flashing state of the left turn signal lamp and the right turn signal lamp based on the left turn signal, the right turn signal, and the steering angle detection signal. Then, in a state in which the left turn signal lamp of the vehicle 12 is illuminated, the video processing section 44 is configured so as to, in the virtual vehicle image 50, overlay display the turn signal effect 56 on a turn signal lamp 50A at the vehicle width direction left side of the virtual vehicle image 50 with reference to the ego vehicle 12 for the driver looking at the touch panel display 20.

In a state in which the right turn signal lamp of the vehicle 12 is illuminated, the video processing section 44 is configured so as to, in the virtual vehicle image 50, overlay display the turn signal effect 56 on a turn signal lamp 50B at the vehicle width direction right side of the virtual vehicle image 50 with reference to the ego vehicle 12 for the driver looking at the touch panel display 20. Note that in FIG. 3, as an example, the virtual mirror video 48 is illustrated as being displayed during a lane change to the vehicle width direction right side of the vehicle 12.

Operation and Advantageous Effects of Present Exemplary Embodiment

Next, description follows regarding the operation and advantageous effects of the present exemplary embodiment.

Figure 6:
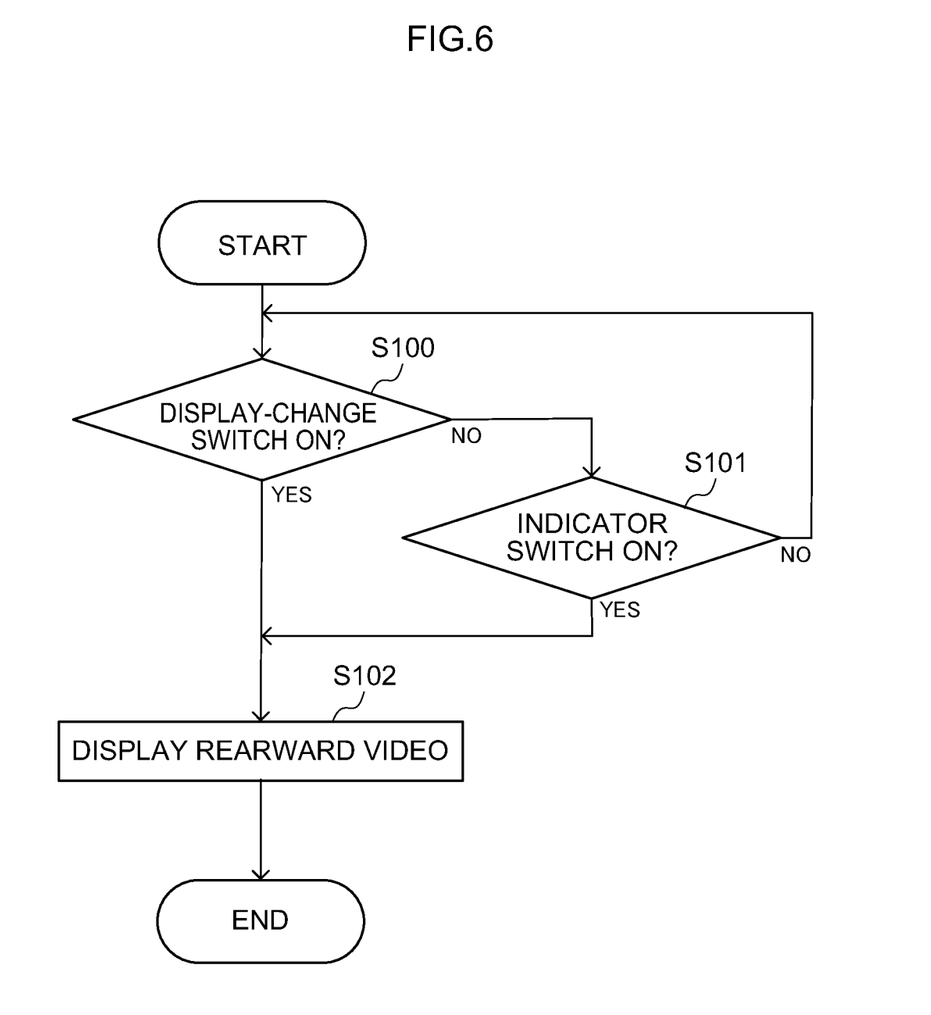
FIG. 6 is a flowchart illustrating a control flow of a vehicle periphery monitoring system according to the present exemplary embodiment.

Description follows regarding a control flow by the vehicle periphery monitoring system 10, mainly using the flowchart illustrated in FIG. 6. This control flow is started when the CPU 26A of the control device 26 receives a specific command signal.

When the control flow has been started, at step S100 the CPU 26A functions at the display change section 40, and determines the presence of absence of a contact operation on the display-change switch icon 46. The CPU 26A then sets the rearward video display mode on the touch panel display 20 when determined that there had been a contact operation on the display-change switch icon 46 (step S100: YES) and proceeds to step S102, and proceeds to step S101 when determined that there had not been a contact operation on the display-change switch icon 46 (step S100: NO).

At step S101, the CPU 26A functions as the display change section 40, and determines the presence or absence of input of a left turn signal or a right turn signal from the indicator switch 24. The CPU 26A sets the rearward video display mode on the touch panel display 20 when determined that there has been input of the left turn signal or the right turn signal from the indicator switch 24 (step S101: YES) and proceeds to step S102, and returns to step S100 when determined that there had not been input of the left turn signal or the right turn signal from the indicator switch 24 (step S101: NO).

At step S102, the CPU 26A functions as the video processing section 44 and displays the virtual mirror video 48 on the touch panel display 20, and ends this control flow.

More specifically, in the present exemplary embodiment as illustrated in FIG. 2, an image rearward of the vehicle is captured by the rear camera 14 at a vehicle width direction central portion of the vehicle 12, an image rearward of the vehicle is captured by the first side camera 16 at the vehicle width direction one-side, and an image rearward of the vehicle is captured by the second side camera 18 at the vehicle width direction other-side.

Moreover, as illustrated in FIG. 3, the virtual mirror video 48 is generated by the video processing section 44 in which the virtual vehicle image 50 virtually illustrating the vehicle 12 and the left-right direction display image 52 indicating the left and right direction of the vehicle 12 are displayed overlaid on the synthesized video 58 synthesized so as to connect the videos captured with the rear camera 14, the first side camera 16, and the second side camera 18 together and so as to be reversed in the vehicle width direction.

The virtual mirror video 48 generated by the video processing section 44 is displayed on the touch panel display 20 disposed at a position visible to the driver of the vehicle 12.

This means that in the present exemplary embodiment, for example, as illustrated in FIG. 2 and FIG. 3, when an other-vehicle 62 is traveling at a rear side of the ego vehicle 12, the virtual vehicle image 50 and a video of the other-vehicle 62 are displayed on the virtual mirror video 48. As a result thereof, the driver is able to ascertain a relative positional relationship between the ego vehicle 12 and the other-vehicle 62 by looking at the virtual mirror video 48 displayed on the touch panel display 20.

Moreover, in the present exemplary embodiment, as well as the left-right direction display image 52, the driver icon 54 and the turn signal effect 56 are also displayed in the virtual mirror video 48. This means that a relative relationship between the left-right directions of the virtual vehicle image 50 and the left-right directions of the ego vehicle 12 can be easily ascertained when the driver of the ego vehicle 12 has looked at the virtual mirror video 48.

Moreover, in the present exemplary embodiment, as illustrated in FIG. 4 and FIG. 5, the display change section 40 is able to switch between the first state in which the virtual mirror video 48 is displayed on the touch panel display 20, and the second state in which the virtual mirror video 48 is not displayed on the touch panel display 20, based on operation of the driver.

This means that in the present exemplary embodiment, for example, various information utilizable by the driver of the ego vehicle 12 can be displayed on the touch panel display 20 in the second state.

In addition thereto, in the present exemplary embodiment, the display change section 40 switches between the first state in which the virtual mirror video 48 is displayed on the touch panel display 20, and the second state in which the virtual mirror video 48 is not displayed on the touch panel display 20, by the driver operating the indicator lever 22.

Thus in the present exemplary embodiment, during a left turn or a right turn of the vehicle 12, the virtual mirror video 48 is displayed on the touch panel display 20, enabling the driver to ascertain a state rearward of the vehicle.

As described above, the present exemplary embodiment is able to indicate a relative positional relationship between the ego vehicle 12, and an object positioned at the periphery of the ego vehicle and at a rear side of the ego vehicle 12.

Supplementary Description of Above Exemplary Embodiment (1) Although in the exemplary embodiment described above the virtual mirror video 48 is displayed on the touch panel display 20, depending on the specification etc. of the vehicle 12, the virtual mirror video 48 may be displayed on a meter display 64 (see FIG. 1) or on a head-up display.

(2) The control section described in the present disclosure and the method thereof may be realized by a custom computer configuring a processor programed so as to execute one or plural functions actualized by a computer program. Or the device described in the present disclosure and the method thereof may be realized by a custom computer configuring a processor with a custom hardware logic circuit. Moreover, the device described in the present disclosure and the method thereof may be realized by one or more custom computers configured by combining a processor that executes a computer program, and one or more hardware logic circuit. The computer program may be stored on a non-transitory computer readable recording medium as instructions to be executed by a computer.

(3) The vehicle periphery monitoring system, and the vehicle periphery monitoring method and program, according to the present disclosure are applicable to a vehicle capable of autonomous driving.

What is claimed is:

1. A vehicle periphery monitoring system comprising:
   a rear camera configured to capture an image of a rearward of a vehicle at a vehicle width direction central portion;
   a first side camera configured to capture an image of the rearward of the vehicle at a vehicle width direction one-side;
   a second side camera configured to capture an image of the rearward of the vehicle at a vehicle width direction other-side;
   a processor configured to execute a program stored in a memory, to generate a virtual mirror video, in which a virtual vehicle image virtually illustrating the vehicle and a left-right direction display image indicating left-right directions of the vehicle are overlaid on a synthesized video that has been synthesized so as to connect videos captured by the rearward image capture section, by the first side camera, and by the second side camera, and so as to be reversed in a vehicle width direction; and
   a display disposed at a position visible to a driver of the vehicle and configured to display the virtual mirror video.

2. The vehicle periphery monitoring system of claim 1, wherein the processor is further configured to switch the display between a first state in which the virtual mirror video is displayed at the display and a second state in which the virtual mirror video is not displayed at the display, based on operation by the driver.

3. The vehicle periphery monitoring system of claim 2, wherein the processor switches the display between the first state and the second state based on operation of an indicator lever by the driver.

4. A vehicle periphery monitoring method comprising:
   generating a synthesized video that has been synthesized so as to connect a first video of a rearward of a vehicle at a vehicle width direction central portion, a second video of the rearward of the vehicle at a vehicle width direction one-side, and a third video of the rearward of the vehicle at a vehicle width direction other-side and so as to be reversed in a vehicle width direction;
   generating a virtual mirror video in which a virtual vehicle image virtually illustrating the vehicle and a left-right direction display image indicating left-right directions of the vehicle are overlaid on the synthesized video; and
   displaying the virtual mirror video at a display.

5. A non-transitory storage medium storing a program causing processing to be executed by at least one processor in a computer, the processing comprising:
   generating a synthesized video that has been synthesized so as to connect a first video of a rearward of a vehicle at a vehicle width direction central portion, a second video of the rearward of the vehicle at a vehicle width direction one-side, and a third video of the rearward of the vehicle at a vehicle width direction other-side and so as to be reversed in a vehicle width direction;
   generating a virtual mirror video in which a virtual vehicle image virtually illustrating the vehicle and a left-right direction display image indicating left-right directions of the vehicle are overlaid on the synthesized video; and
   performing display control of the virtual mirror video.

* * * * *